Aug. 30, 1955  J. E. BUXTON  2,716,346
ENGINE STARTER GEARING
Filed Jan. 18, 1954
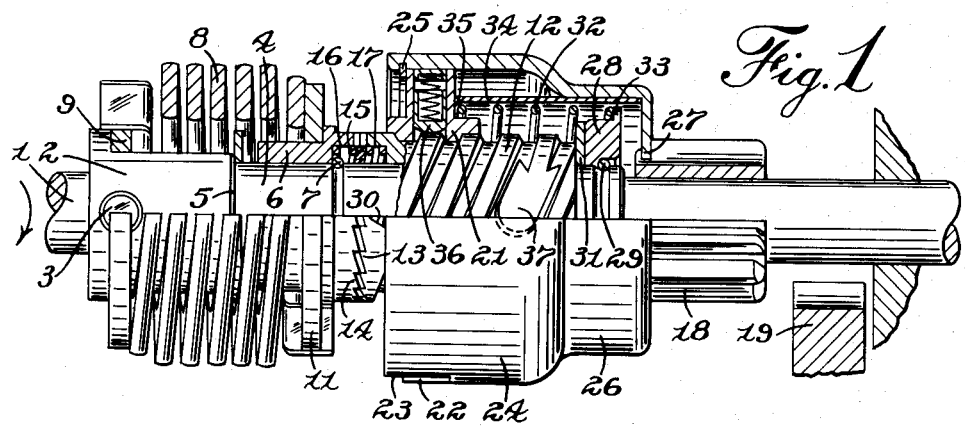
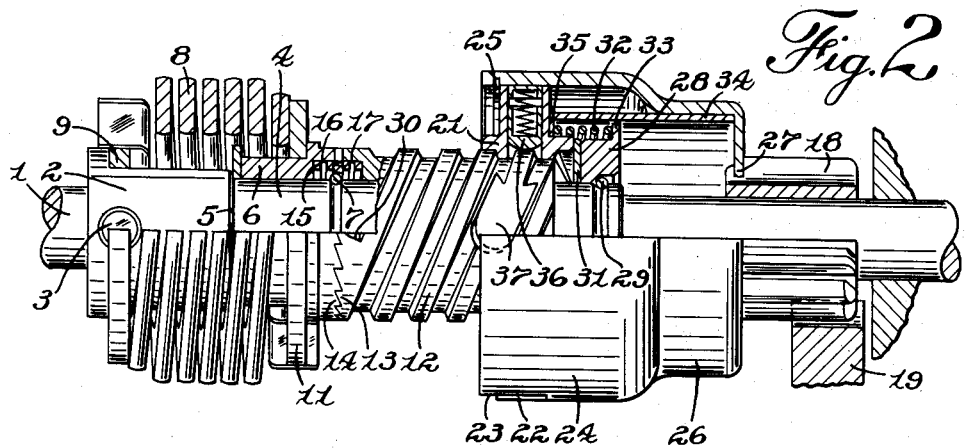
WITNESS:
INVENTOR.
James E. Buxton
BY
ATTORNEY

United States Patent Office 2,716,346
Patented Aug. 30, 1955

2,716,346

ENGINE STARTER GEARING

James E. Buxton, Elmira, N. Y., assignor to Bendix Aviation Corporation, Elmira Heights, N. Y., a corporation of Delaware Application January 18, 1954, Serial No. 404,489

3 Claims. (Cl. 74—7)

The present invention relates to engine starter gearing and more particularly to that type of automatically traversing drive which maintains the gearing meshed until a successful start is secured. The present invention is an improvement of the structure disclosed in applicant's prior Patent No. 2,609,695 issued September 9, 1952.

In said prior patent the drive pinion is controlled by a nut threaded on a screw shaft which is driven through a dental overrunning clutch; and a detent on the control nut holds the control nut in advanced position on the screw shaft until released by centrifugal force, which detent also serves to prevent the control nut from drifting away from idle position.

This arrangement has met with wide commercial acceptance, but there are some instances in which it would be desirable to use a compression spring type of anti-drift such as shown for instance in the patent to Sekella No. 2,062,430, dated December 1, 1936, if this could be accomplished without adversely affecting the operation of the overrunning clutch.

It is an object of the present invention to provide a novel starter drive of the type above described having a compression type of anti-drift spring, incorporating means for separating the overrunning clutch members during the time that the clutch is overrunning.

It is another object to provide such a device in which the means for separating the overrunning clutch members is in the form of a spring which is also capable of itself operating as a friction coupling for transmitting torque to the screw shaft.

Further objects and advantages will be apparent from the following description taken in connection with the accompanying drawing in which:

Fig. 1 is a side elevation, partly broken away and in section of a preferred embodiment of the invention showing the parts in idle position; and Fig. 2 is a similar view showing the parts in cranking position.

In Fig. 1 of the drawing there is illustrated a power shaft 1 on which a hollow sleeve 2 is fixedly mounted by suitable means such as a cross pin 3. Sleeve 2 is provided with a portion 4 of reduced diameter forming a shoulder 5, and a driving clutch member 6 is slidably journalled thereon between said shoulder and a stop ring 7. Clutch member 6 is yieldably driven from the sleeve 2 by means of a spring 8 which is anchored at its ends to said sleeve and clutch member respectively by means of the anchor plates 9 and 11 non-rotatably mounted thereon and having slots receiving the outturned ends of said spring.

A hollow screw shaft 12 is slidably journalled on the reduced portion 4 of sleeve 2 and is provided with overrunning clutch teeth 13 arranged to cooperate with similar clutch teeth 14 on the driving clutch member 6 but normally held out of engagement by a compression spring 15 which is seated at its ends in smooth cylindrical counter-bores 16, 17 in the clutch member and screw shaft respectively.

A pinion 18 is slidably journalled on the power shaft 1 for longitudinal movement into and out of mesh with a gear 19 of an engine to be started. Means for actuating the pinion 18 from the screw shaft 12 is provided comprising a control nut 21 threaded on the screw shaft and having radial lugs 22 received in slots 23 in one end of a barrel member 24 and retained therein by means of a lock ring 25. The opposite end of the barrel is reduced in diameter as shown at 26 and is rigidly connected to the pinion 18 as indicated at 27.

The meshing movement of the control nut is limited by means of a stop collar 28 positioned on the end of sleeve 2 by means of a lock ring 29. A thrust washer 31 is preferably interposed between the control nut and stop collar 28, and also serves to limit the movement of the screw shaft 12 away from the driving clutch member 6.

The idle position of the pinion is defined by an abutment on the screw shaft formed by the ends or "heels" 30 of the threads. Means for normally holding the pinion and its associated parts in idle position is provided in the form of a coiled compression anti-drift spring 32 bearing at one end against the control nut 21 and resting at its other end on the stop collar 28 against a peripheral flange 33 formed thereon. In order to prevent "ballooning" of the anti-drift spring 32 during high speed rotation of the barrel 24, a sleeve 34 is slidably mounted in the reduced end 26 of barrel 24 and is provided with an inturned flange 35 receiving the end of the anti-drift spring 32 which is seated on the control nut.

Means for holding the pinion 18 in mesh with the engine gear 19 until a successful start has been secured is provided in the form of a spring pressed detent 36 mounted for radial sliding movement in the control nut 21 and bearing on the periphery of the screw shaft 12. Said screw shaft is provided with a notch 37 in position to receive the detent 36 when the pinion approaches meshed position, and to prevent the control nut from threading itself back to idle position until the pinion and barrel are rotated by the engine gear at sufficient speed to withdraw the detent by centrifugal force.

The clutch opening spring 15 is formed with flattened convolutions having a smooth exterior surface bearing frictionally in the interior surfaces of the counter-bores 16, 17; and the spring is wound in such a direction that when the driving clutch member 6 is rotated by the power shaft 1, the spring tends to expand and grip the bearing surfaces of the clutch member and screw shaft so as to form a frictional coupling there-between. When the screw shaft is overrunning the clutch member however, the spring 15 tends to contract and permit the screw shaft to overrun freely.

When the parts are in idle position, the spring 15 holds the clutch teeth 13, 14 out of engagement as illustrated in Fig. 1. Rotation of the power shaft however causes torque to be transmitted through the spring 15 to the screw shaft 12 which causes traversal of the control nut, barrel and pinion to the right in Fig. 1, and at the same time by reaction causes the screw shaft to move to the left, meshing the clutch teeth 13, 14. When the meshing movement of the control nut 21 is arrested by the stop collar 28, the clutch teeth 13, 14 are forced tightly together by the screw-jack action by the screw shaft and control nut and cranking takes place.

When the engine fires, the acceleration of the pinion 18 causes the control nut 21 to move back on the screw shaft until the detent 36 is stopped by the end of the notch 37. At this time, the control nut has moved away from the stop collar 28 sufficiently to permit the clutch teeth 13 to overrun the clutch teeth 14, whereupon these teeth are held separated by the spring 15 in spite of the pressure of the anti-drift spring 32 which would otherwise tend to cause the clutch teeth to rub on each other.

When a successful start is secured, the pinion 18 and control nut 21 are rotated by the engine gear sufficiently rapidly to withdraw the detent 36, whereupon the parts are returned to idle position where they are yieldingly maintained by the anti-drift spring 32.

Although but one embodiment of the invention has been shown and described in detail, it will be understood that other embodiments are possible and that changes may be made in the design and arrangement of the parts without departing from the spirit of the invention.

I claim:

1. In an engine starter drive a power shaft, a driving clutch member mounted thereon, means for connecting the clutch member to rotate with the power shaft, a driven clutch member and hollow screw shaft rotatably mounted on the power shaft, a stop collar fixedly mounted with respect to the power shaft, limiting movement of the screw shaft away from the driving clutch member, a pinion slidably journalled on the power shaft for movement into and out of mesh with a gear on the engine to be started, a control nut threaded on the screw shaft, a barrel member connecting the control nut to the pinion, said stop collar having an abutment surface limiting the meshing movement of the control nut, the thread of the screw shaft terminating in an abutment defining the idle position of the control nut thereon; a compression anti-drift spring between the control nut and stop collar urging the control nut toward idle position, and the screw shaft into clutching engagement with the driving clutch member, and a clutch spring between the clutch members normally holding them separated.

2. A starter drive as set forth in claim 1 in which the stop collar is provided with a flange forming a seat for the end of the anti-drift spring, and including further a cylindrical sleeve in the barrel of slightly larger diameter than said flange, enclosing and confining the anti-drift spring between said flange and the control nut.

3. A starter drive as set forth in claim 1 in which the clutch spring is operative to frictionally transmit rotation from the driving clutch member to the screw shaft.

References Cited in the file of this patent

UNITED STATES PATENTS 2,656,727    Buxton et al. _____ Oct. 27, 1953